United States Patent
Linder et al.

(10) Patent No.: US 10,708,381 B2
(45) Date of Patent: Jul. 7, 2020

(54) INFORMATION CENTRIC POPULAR CONTENT BROADCASTING

(71) Applicant: Telefonaktiebolaget LM Ericsson (publ), Stockholm (SE)

(72) Inventors: Neiva Linder, Stockholm (SE); Kim Laraqui, Solna (SE); Ala Nazari, Handen (SE); Ioanna Pappa, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 32 days.

(21) Appl. No.: 15/780,631

(22) PCT Filed: Dec. 16, 2015

(86) PCT No.: PCT/SE2015/051354
§ 371 (c)(1),
(2) Date: May 31, 2018

(87) PCT Pub. No.: WO2017/105302
PCT Pub. Date: Jun. 22, 2017

(65) Prior Publication Data
US 2018/0352046 A1  Dec. 6, 2018

(51) Int. Cl.
*H04L 12/00* (2006.01)
*H04L 29/08* (2006.01)
(Continued)

(52) U.S. Cl.
CPC ...... *H04L 67/2842* (2013.01); *H04L 65/4076* (2013.01); *H04L 65/4084* (2013.01);
(Continued)

(58) Field of Classification Search
CPC ............. H04L 65/4076; H04L 65/4084; H04L 67/2842; H04L 67/2838; H04N 21/433;
(Continued)

(56) References Cited

U.S. PATENT DOCUMENTS 8,694,675 B2 * 4/2014 Wang .................... H04L 67/327
  709/206
8,724,535 B2 * 5/2014 Lohmar ................ H04L 12/189
  370/312
(Continued)

FOREIGN PATENT DOCUMENTS

WO   2009018848 A1   2/2009

OTHER PUBLICATIONS

International Search Report and Written Opinion for International Application No. PCT/SE2015/051354, dated Sep. 8, 2016, 10 pages.
(Continued)

*Primary Examiner* — Frantz Coby
(74) *Attorney, Agent, or Firm* — NDWE LLP

(57) ABSTRACT

A User Equipment (UE) a method performed at the UE of acquiring content, a Radio Base Station (RBS), and a method performed at the RBS of supplying Information Centric Networking (ICN) content to at least one UE. In a first aspect, a method is performed at a UE of acquiring content. The method comprises submitting a request for content to an RBS, receiving, in reply to the request, the requested content from the RBS, the content being acquired by the RBS from an ICN node and provided to the UE from the RBS upon the RBS receiving the ICN content, storing the received ICN content in a local storage at the UE, and acquiring, when a piece of content is to be rendered at the UE, the piece of content from the received ICN content in the local storage.

22 Claims, 6 Drawing Sheets

(51) Int. Cl.
*H04L 29/06* (2006.01)
*H04N 21/433* (2011.01)
*H04W 4/06* (2009.01)
*H04N 21/845* (2011.01)
*H04W 88/16* (2009.01)
*H04W 76/40* (2018.01)

(52) U.S. Cl.
CPC ....... *H04L 67/2838* (2013.01); *H04N 21/433* (2013.01); *H04N 21/8456* (2013.01); *H04W 4/06* (2013.01); *H04W 88/16* (2013.01); *H04W 76/40* (2018.02)

(58) Field of Classification Search
CPC .. H04N 21/8456; H04W 76/40; H04W 88/16; H04W 4/06
USPC .................. 709/213, 242, 227, 217–219
See application file for complete search history.

(56) References Cited

U.S. PATENT DOCUMENTS

| | | | | |
|---|---|---|---|---|
| 8,762,477 | B2* | 6/2014 | Xie | H04L 67/327 709/213 |
| 9,379,970 | B2* | 6/2016 | Wang | H04L 63/0272 |
| 9,503,358 | B2* | 11/2016 | Garcia-Luna-Aceves | H04L 43/10 |
| 9,552,493 | B2* | 1/2017 | Uzun | H04L 63/06 |
| 9,929,954 | B2* | 3/2018 | Azgin | H04L 45/7453 |
| 2010/0161756 | A1 | 6/2010 | Lewis et al. | |
| 2013/0111063 | A1* | 5/2013 | Lee | H04L 45/125 709/241 |
| 2013/0246631 | A1* | 9/2013 | Gonzales | H04N 21/6405 709/227 |
| 2013/0339481 | A1* | 12/2013 | Hong | H04L 67/16 709/217 |
| 2014/0192717 | A1* | 7/2014 | Liu | H04W 60/00 370/328 |
| 2014/0204945 | A1* | 7/2014 | Byun | H04L 45/74 370/392 |
| 2015/0163127 | A1* | 6/2015 | Garcia-Luna-Aceves | H04L 43/10 709/242 |
| 2015/0222479 | A1* | 8/2015 | Kim | H04W 28/0236 370/218 |
| 2016/0036730 | A1* | 2/2016 | Kutscher | H04L 45/38 370/401 |
| 2016/0100350 | A1* | 4/2016 | Laraqui | H04L 67/2842 370/328 |
| 2016/0224799 | A1* | 8/2016 | Uzun | G06F 21/6227 |
| 2017/0104681 | A1* | 4/2017 | Azgin | H04L 45/7453 |
| 2017/0302563 | A1* | 10/2017 | Wang | H04L 45/122 |

OTHER PUBLICATIONS

International Preliminary Report on Patentability for International Application No. PCT/SE2015/051354, dated Jun. 28, 2018, 8 pages.
Communication pursuant to Article 94(3) EPC for EP Application No. 15823038.3, dated Apr. 11, 2019, 8 pages.

* cited by examiner

US 10,708,381 B2

INFORMATION CENTRIC POPULAR CONTENT BROADCASTING

CROSS-REFERENCE TO RELATED APPLICATIONS

This application is a National stage of International Application No. PCT/SE2015/051354, filed Dec. 16, 2015, which is hereby incorporated by reference.

TECHNICAL FIELD

The invention relates to a User Equipment (UE) and a method performed at the UE of acquiring content, a Radio Base Station (RBS), and a method performed at the RBS of supplying Information Centric Networking (ICN) content to at least one UE.

BACKGROUND

Over recent years, Information/Content Centric Networking (ICN/CCN) is gaining momentum as a future technology for 5th generation mobile networks ("5G") and other coming technologies for media distribution, device software upgrades and the Internet of Things (IoT). All major variants of ICN/CCN assume symmetric connections in-between consumers and producers of content. This creates issues with using unidirectional mechanisms such as 3rd Generation Partnership Project (3GPP) multicast/broadcast over the radio interface. In essence, these two different structures are difficult to combine.

FIG. 1 illustrates an operating principle of dominating ICN/CCN proposals today. This operating principle assumes that a link used in one direction—e.g. between Node 1 and Node 2 essentially being switches equipped with large caches for transporting content—to send content requests from subscribers is also used in the other direction to send the corresponding content back via Node 1 and Node 2 from a content provider to the subscribers. All links in ICN/CCN are therefore assumed to allow for bi-directional communication.

Multicast support is a key feature in ICN/CCN when transporting a particular content from a content provider to various subscribers/end users whom have requested content from that particular content provider. Whenever a node which has received content requests from several subscribers over different interfaces (each node being illustrated to comprise four interfaces in FIG. 1) receives requested content available for delivery, the node will deliver the requested content to the subscribers over a respective interface.

With reference to FIG. 1, if both Subscriber 1 and 2 request the same content, e.g. a live video stream, both subscribers will submit a request to Node 1. However, Node 1 will only forward a single request to Node 2 for that video stream, and Node 2 will as a result forward the single request towards the content provider. The content provider will thereafter return a single copy of the requested live stream to Node 2. Likewise, Node 2 will only send one copy of the live stream over its link to Node 1. Node 1 will then replicate the content of the video stream and send it to both Subscriber 1 and 2.

FIG. 2 illustrates transmission of live content over a 3GPP network. If ICN/CCN is implemented in a Radio Access Network (RAN) part of the system alongside a 3GPP core network, referred to as an Evolved Packet Core (EPC) network in case of implementation in a Long-Term Evolution (LTE) network, then it cannot be combined with Enhanced Multicast Broadcast Multimedia Service (eMBMS) for broadcasting/multicasting popular content since eMBMS requires termination in the core network.

Conversely, eMBMS as per standard 3GPP solutions requires an overlay over Internet Protocol (IP) in the mobile backhaul/3GPP core network for supporting multicasting. This is necessary since in eMBMS a set of new core nodes and interfaces are added in order to inject traffic to be multicasted across many eNodeBs.

There is hence no known solution for combining ICN-in-RAN with eMBMS. While eMBMS assumes a new set of nodes to be connected to the EPC network via a Packet Data Network Gateway (PGW) as well as support for IP and IP-based multicasting inside the RAN, ICN-in-RAN assumes none of this.

To the contrary, ICN-in-RAN aims to terminate radio bearers locally via cell site switches (similar to the nodes illustrated in FIG. 1) that support ICN. ICN-in-RAN only assumes services of a Mobility Management Entity (MME and Home Subscriber Server (HSS) in the EPC network in order to establish radio bearers for carrying ICN, for control plane signalling. However, ICN-in-RAN cannot make use of standard eMBMS, since eMBMS requires IP and EPC network user plane signalling.

SUMMARY

An object of the present invention is to solve, or at least mitigate this problem in the art, and to provide an improved method of efficiently supplying requested content to an end user.

This object is attained in a first aspect of the invention by a method performed at a User Equipment (UE) of acquiring content. The method comprises submitting a request for content to a Radio Base Station (RBS), receiving, in reply to the request, the requested content from the RBS, the content being acquired by the RBS from an Information Centric Networking (ICN) node and provided to the UE from the RBS upon the RBS receiving the ICN content, storing the received ICN content in a local storage at the UE, and acquiring, when a piece of content is to be rendered at the UE, the piece of content from the received ICN content in the local storage.

This object is attained in a second aspect by UE configured to acquire content, which UE comprises a processing unit and a memory, which memory contains instructions executable by the processing unit, whereby the UE is operative to submit a request for content to an RBS, receive, in reply to the request, the requested content from the RBS, the content being acquired by the RBS from an ICN node and provided to the UE from the RBS upon the RBS receiving the ICN content, store the received ICN content in the memory of the UE, and acquire, when a piece of content is to be rendered at the UE, the piece of content from the received ICN content in the memory.

This object is attained in a third aspect of the invention by a method performed at an RBS of supplying ICN content to at least one UE. The method comprises receiving a request for content from the at least one UE, submitting a request for the content to at least one ICN node, receiving the requested content from the ICN node, submitting the received ICN content to said at least one UE, for subsequent caching at the at least one UE, and continuously submitting requests for the requested content to said at least one ICN node and submitting any further received ICN content to said at least one UE, until no further content is received from the at least one ICN node.

This object is attained in a fourth aspect by an RBS configured to supply ICN content to at least one UE, which RBS comprises a processing unit and a memory, which memory contains instructions executable by the processing unit, whereby the RBS is operative to receive a request for content from the at least one UE, submit a request for the content to an ICN node, receive the requested content from the at least one ICN node, submit the received ICN content to said at least one UE, for subsequent caching at the at least one UE, and continuously submit requests for the requested content to said at least one ICN node and submit any further received ICN content to said at least one UE, until no further content is received from the at least one ICN node.

Advantageously, when a UE wishes to render content, for instance a television show, the UE requests the content from an RBS to which it is connected.

In case the invention is implemented in a Long-Term Evolution (LTE) communication network, the RBS is referred to as an eNodeB.

Now, when the RBS receives the requests for content, it submits a request to an ICN node operatively associated to the RAN, which in its turn may forward the request to one or more further upstream ICN nodes and possibly on to a content provider, which will use the chains of ICN nodes to transport the requested content downstream to the RBS. It should be noted that the ICN node may be separate from the RBS, but it may alternatively be implemented within the RBS.

When the requested content arrives at the RBS via the ICN nodes, the RBS will submit the ICN content to the UE requesting the content. Upon receiving the ICN content from the RBS, the UE stores the received content in a local storage, such as a cache memory. When a client, such as a media player or audio player, of the UE wishes to render the requested content, the player will turn to the local storage. This is highly advantageous, as there is no need for the UE to request any further pieces of content, or "chunks", pertaining to the television show from the RBS over the air interface, unless the UE wishes to switch over to for instance another television program.

The RBS will on its side continuously submit upstream requests for further streams of the requested content to be submitted to the UE as long as a user of the UE wishes to view the television show.

Thus, a UE would advantageously only have to send a request for the television show, whereupon the RBS fetches the corresponding content via the ICN nodes and submits it to the UE, which continuously will cache the received content locally for fast access, while the RBS advantageously keeps the streaming of the television show alive by submitting upstream requests to the ICN content provider in order to continuously attain ICN content for subsequent caching at the UE.

In case a piece of content is missing in the local storage of one or more of the UEs, the UE(s) may submit a further request to the RBS to provide the missing piece of content.

Hence, with the invention, an ICN structure customized for fast and efficient delivery of content to UEs has advantageously been implemented with a core network of an appropriate communications system, such as an EPC network in LTE.

In an embodiment of the invention, a plurality of UEs submits requests for a particular piece of content to the RBS and the requested content is subsequently acquired by the RBS in one common request to the ICN node(s) and multicasted to the plurality of UEs.

Advantageously, when a number of UEs wishes to render the same content, for instance a live football game, the UEs requests the content from an RBS to which they are connected. Hence, in line with ICN operating principles, each UE send a request to the RBS.

Now, when the RBS receive the requests for content, it submits one common request to an ICN node in the RAN, which in its turn may forward the request to one or more further upstream ICN nodes and potentially on to a content provider, being a final content source, which will use the chains of ICN nodes to transport the requested content downstream to the RBS.

When the ICN content arrives at the RBS via the ICN nodes, the RBS will multicast the ICN content to the UEs having requested the content. In an embodiment, the multicasting is performed using eMBMS, which implies that the UEs involved have been asked to monitor a multicast channel to acquire the relevant content.

Upon receiving the multicasted ICN content, each UE stores the received content in a local storage, such as a cache memory, as was described in the previous embodiment. When a media player of the respective UE wishes to render the requested content, the player will turn to the local storage.

Again, this is highly advantageous, as there is no need for a UE to request any further content chunks pertaining to the live football game from the RBS over the air interface, unless a UE wishes to switch over to another content stream, such as another sports event. Further, since the RBS sends a common request for all the UEs, upstream ICN traffic is advantageously reduced.

Hence, in this multi-request scenario, bandwidth savings in the system will be even more evident with the invention as compared to a scenario where the RBS handles one request for a first UE, another request for a second UE, and so on, for a particular piece of content.

As previously has been described, the RBS will on its side continuously submit upstream requests for further live streams of the football game to be multicasted to the UEs as long as the UEs wishes to view the live event. Thus, each UE would advantageously only have to send a request for the live streaming event, whereupon the RBS fetches the corresponding content via the ICN nodes and multicasts it to the UEs, which continuously will cache the received multicasted content locally for fast access, while the RBS advantageously keeps the streaming of the event alive be submitting upstream requests to the ICN node(s) in order to continuously attain ICN content for subsequent caching at the UE.

In case a piece of content is missing in the local storage of one or more of the UEs, the UE(s) may submit a further request to the RBS to provide the missing piece of content.

In a further embodiment of the invention, even though only one UE submits a request for content to the RBS, the RBS will still multicasting the acquired ICN content to a plurality of UEs, for caching at said plurality of UEs. Advantageously, there are mechanisms by which the RBS can anticipate which content a certain UE will want to receive, even though the UE yet has not requested the content. This may be particularly true in case of much-requested content where the probability may be high that even further UEs would want to render the much-requested content (without having sent an explicit request).

The UE may be embodied in the form of wireless communication devices such as smart phones, tablets, laptops, etc., or a so called fixed wireless terminal (FWT) in the form of e.g. a television set, a computer, or a set top box.

It should be noted that a 5G/LTE based scenario is equally applicable to mobile broadband data and fixed-wireless access. That will allow 5G radio and its promised massive capacity and technical enablers (e.g. massive beamforming) to feed customer premises equipment in homes, with backhauling capacity and thus complement and/or challenge fixed broadband access (such as copper-based digital subscriber lines, DSL.

The object is attained in a fifth aspect of the invention by computer programs comprising computer-executable instructions for causing devices to perform steps of the methods of the invention when the computer-executable instructions are executed on a processing unit included in the devices.

The object is attained in a sixth aspect of the invention by computer program products comprising computer readable mediums, the computer readable mediums having the computer programs of the fifth aspect embodied thereon.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
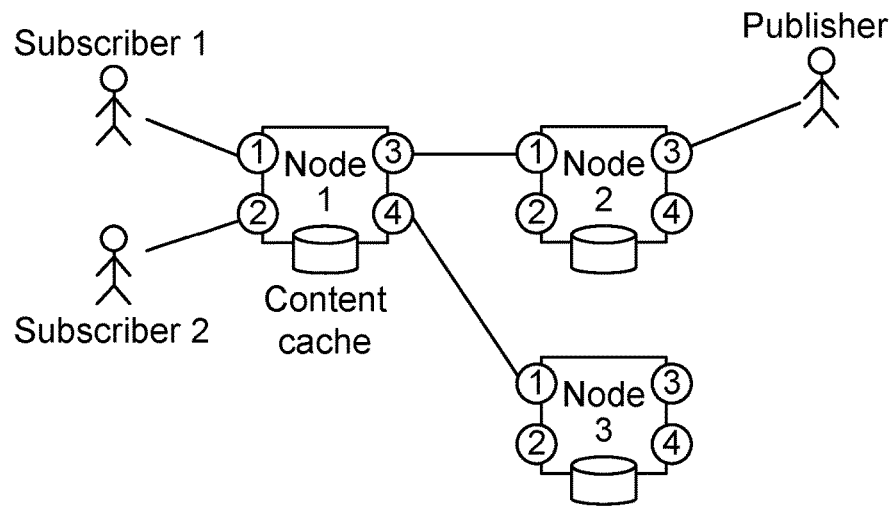
FIG. 1 illustrates an operating principle of prior art ICN/CCN technology.

FIG. 1 illustrates an operating principle of dominating ICN/CCN proposals today and has been previously discussed.

Figure 2:
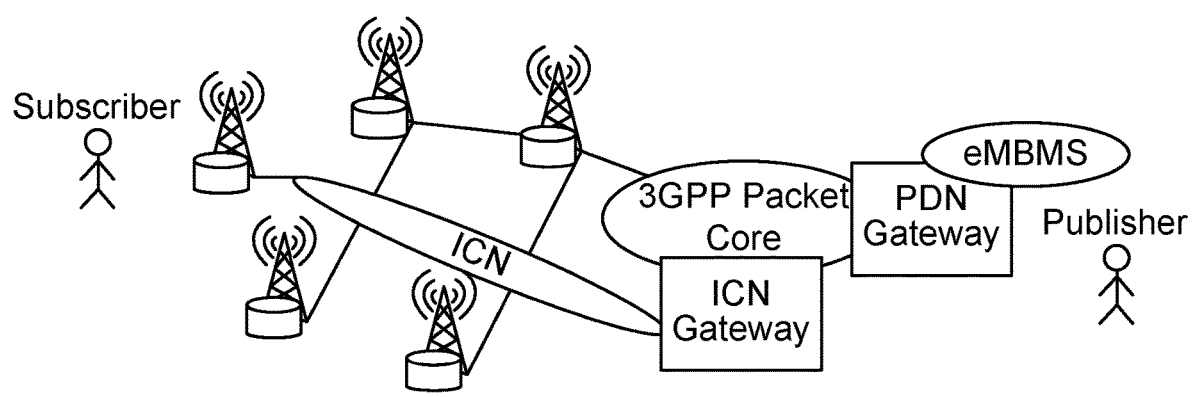
FIG. 2 illustrates transmission of live content over a 3GPP network.

FIG. 2 illustrates transmission of live content over a 3GPP network and has been previously discussed.

Figure 3:
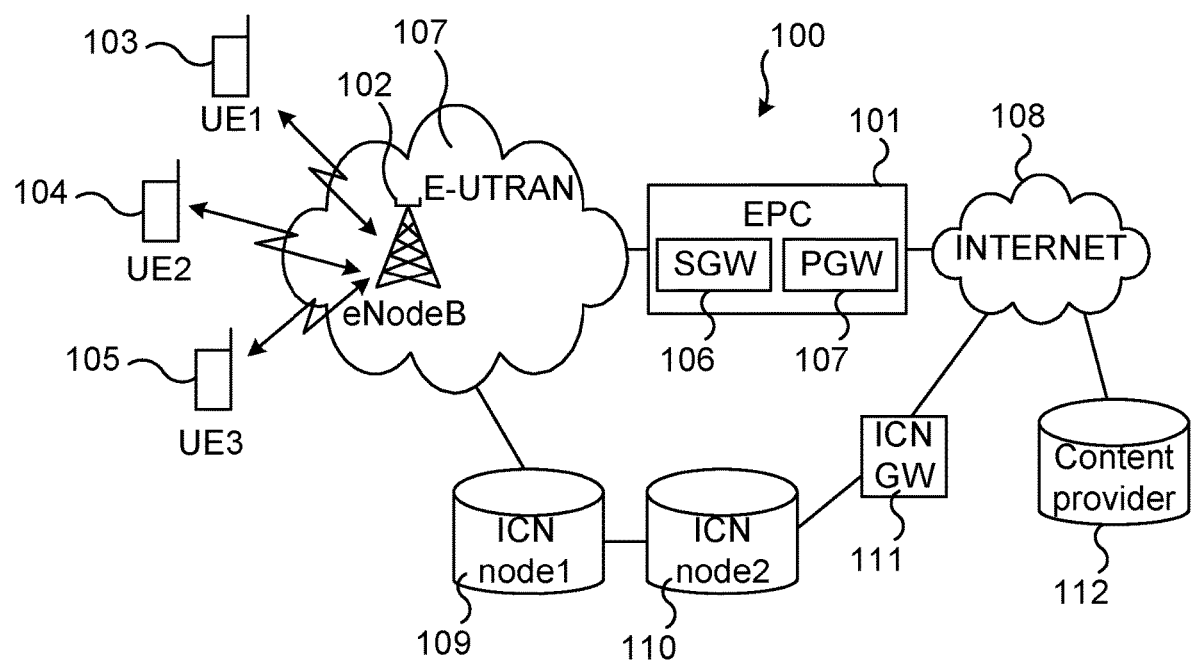
FIG. 3 shows a schematic overview of an exemplifying wireless communication system in which the present invention can be implemented.

FIG. 3 shows a schematic overview of an exemplifying wireless communication system in which the present invention can be implemented.

The wireless communication system 100 is an LTE based system, where the packet core network 101 is referred as an Evolved Packet Core (EPC) network.

The wireless communication system 100 comprises a base station 102 in the form of an eNodeB, which forms the LTE radio access network E-UTRAN 107. In practice, a number of eNodeBs together form the E-UTRAN. The eNodeB is a radio access node that interfaces with one or more mobile radio terminals (UEs), in this schematic overview illustrated by a first UE 103, a second UE 104, and a third UE 105.

The eNodeB 102 is operatively connected to a Serving Gateway (SGW) 106 configured to route and forward user data packets, in turn operatively connected to an upstream Packet Data Network Gateway (PGW) 107, which provides connectivity from the UEs to external packet data networks 108, such as the Internet, by being the point of exit and entry of traffic for the UEs. It should be noted that FIG. 3 is for illustrational purposes only, and that e.g. the EPC network 101 in practice is far more complex with a variety of functional nodes intercommunicating with each other.

Further illustrated in FIG. 3 are a first ICN node 109 and a second ICN node 110, the first ICN node 109 connecting downstream to the eNodeB 102 in the E-UTRAN 107 and the second ICN node 110 connecting upstream to an ICN gateway in for access to the IP network 108. As previously mentioned, the ICN nodes are essentially switches equipped with large caches for storing much-requested content for rapid delivery upon request.

Hence, requests for popular content from UE1, UE2 and UE3 will be sent to the eNodeB 102, which in its turn will send an upstream request to the first ICN node 109 and if the requested content is not residing in its cache, the request will proceed upstream to the second ICN node 110, and so on, potentially all the way via the ICN GW 111 and the IP network 108 to a content provider 112 being the source of the content.

Once the content has been encountered at one of the nodes, for the second ICN node 110, the content will be delivered via the same bi-directional link in a downstream direction via the first ICN node 109 to the eNodeB 102, which in its turn broadcasts the requested content to the three UEs.

Thus, the structure of ICN advantageously allows for more rapid delivery of popular, much-requested content as compared to data request and delivery occurring over the core network 101. It should further be noted that even though content would be requested from a single one of the UEs, and thus not be considered a much-requested piece of content, the fetching and delivery of the requested content via ICN may still be advantageous as compared to fetching and delivering the requested content via e.g. a Content Data Network (CDN), which would require access via the EPC.

FIG. 3 functionally illustrates that the first ICN node 109 and the second ICN node 110 are separate from eNodeB 102. However, in an embodiment of the invention, one or more of the ICN nodes 109, 110 are arranged within eNodeB 102.

Figure 4:
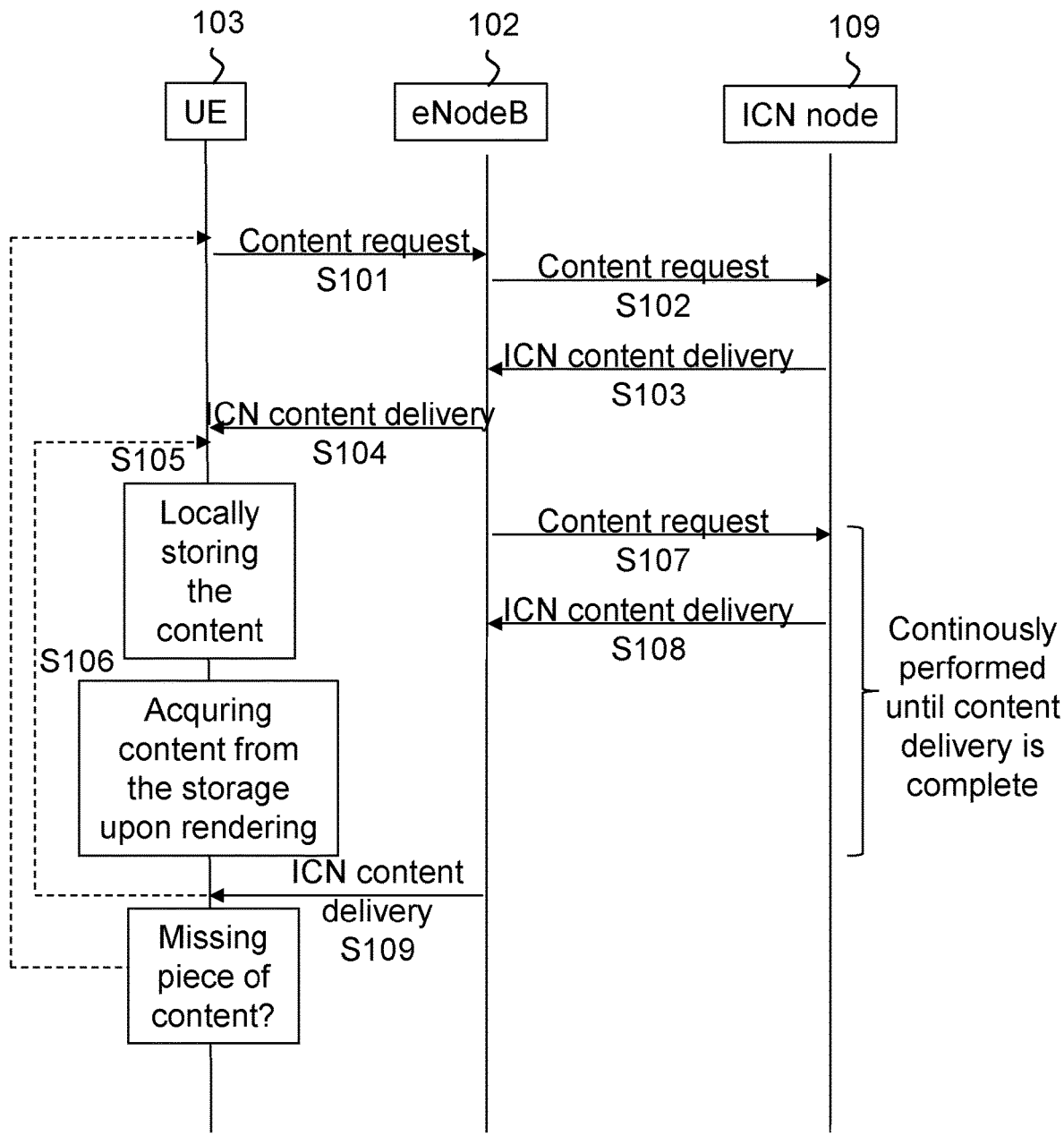
FIG. 4 shows a timing diagram illustrating an embodiment of the invention of delivering ICN content acquired by an eNodeB from an ICN node to a single requesting UE.

FIG. 4 shows a timing diagram illustrating an embodiment of the invention of delivering ICN content acquired by an eNodeB 102 from an ICN node 109 to a single requesting UE 103.

In a first step S101, the UE 103 submits a request for content to the eNodeB 102. Upon receiving the request, the eNodeB 102 submits a request for the content to the ICN node 109, which replies by delivering the requested content to the eNodeB 102 in step S103.

The eNodeB 102 hence submits the received ICN content to the UE 103 in step S104. Upon receiving the requested content in step S104, the UE 103 stores the received ICN content in a local storage in step S105, such as a cache memory at the UE.

Now, when a piece of content is to be rendered at the UE 103, for instance by a media player, the player will in step S106 turn to the local storage for fetching said piece of content from the received ICN content, and in case the piece of content is comprised in the ICN content in the local storage, the UE 103 acquires the piece of content from the received ICN content in the local storage.

Concurrently, in case for instance the requested content is part of a live streaming event, such as a football game, the eNodeB 102 will continuously keep the streaming of the content alive by continuously submitting upstream requests to the ICN node 109 in step S107 in order to continuously attain ICN content in step S108.

These continuously received ICN content chunks are provided to the UE 103 in step S109 for caching at the UE 103.

If the UE should not be able to find a desired piece of content to be rendered in the local storage, it will have to start the process over and submit a further request for content to the eNodeB 102 in step S101.

Figure 5:
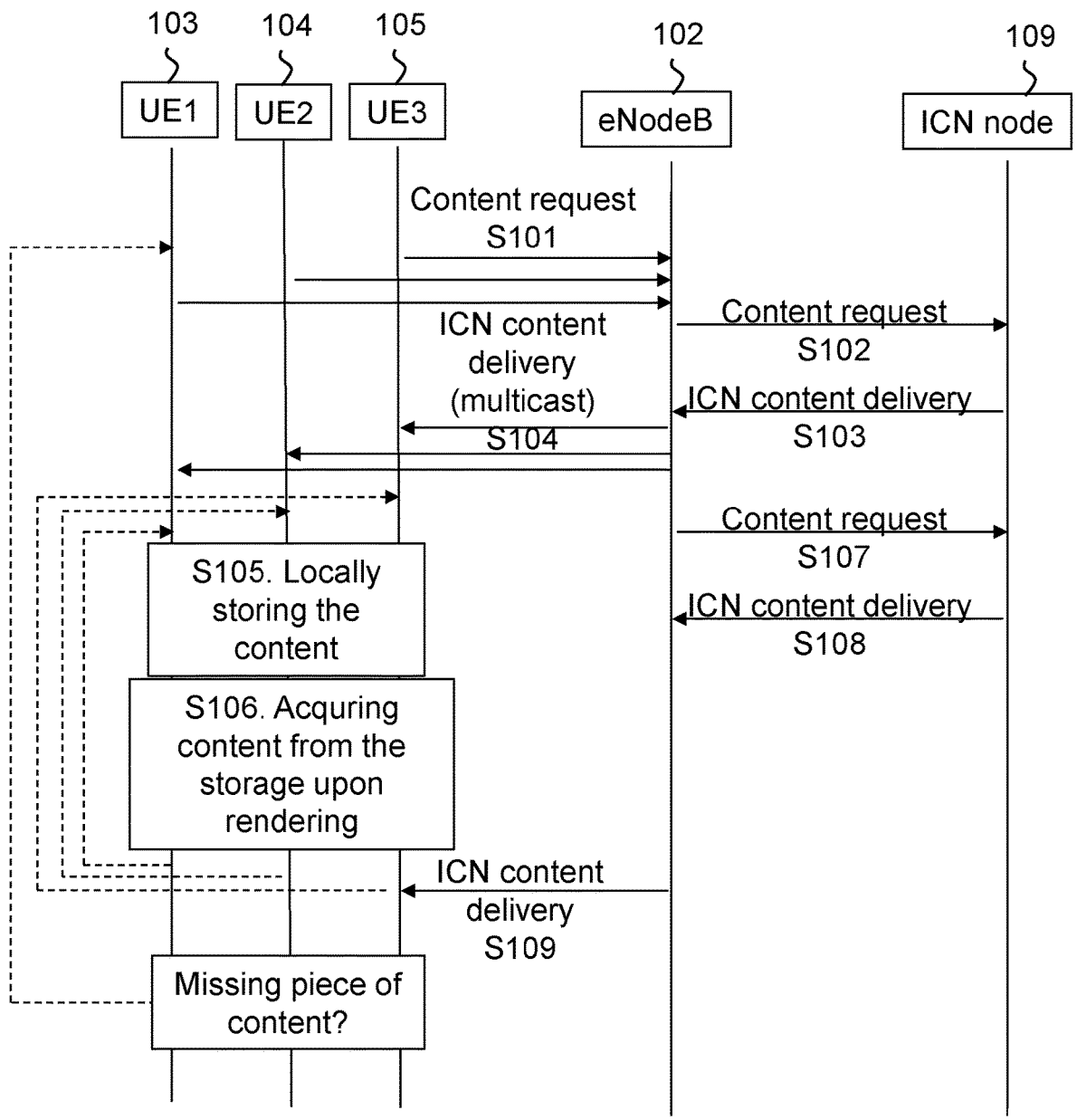
FIG. 5 shows a timing diagram illustrating an embodiment of the invention of delivering ICN content acquired by an eNodeB from an ICN node to a plurality of requesting UEs.

FIG. 5 shows a timing diagram illustrating an embodiment of the invention of delivering ICN content acquired by an eNodeB 102 from an ICN node 109 to a plurality of requesting UEs 103, 104, 105.

In a first step S101, all three UEs 103, 104, 105 submit a request for content to the eNodeB 102. Upon receiving the request, the eNodeB 102 submits one common request for the content to the ICN node 109, which replies by delivering the requested content to the eNodeB 102 in step S103.

The eNodeB 102 thereafter submits the received ICN content in multicast to all three UEs 103, 104, 105 in step S104, for instance using eMBMS. Upon receiving the requested content in step S104, each UE 103, 104, 105 stores the received ICN content in a respective local storage in step S105, such as a cache memory.

Now, when a piece of content is to be rendered at the respective UE 103, 104, 105, for instance by a media player, the respective player will in step S106 turn to the local storage for fetching said piece of content from the received ICN content, and in case the piece of content is comprised in the ICN content in the local storage, the respective UE 103, 104, 105 acquires the piece of content from the received ICN content in the local storage.

Concurrently, in case for instance the requested content is part of a live streaming event, such as a football game, the eNodeB 102 will continuously keep the streaming of the content alive by continuously submitting upstream requests to the ICN node 109 in step S107 in order to continuously attain ICN content in step S108.

These continuously received ICN content chunks are provided in multicast to the UEs 103, 104, 105 in step S109 for local caching.

Again, if one or more of the UEs 103, 104, 105 should not be able to find a desired piece of content to be rendered in its local storage, it will have to start the process over and submit a further request for content to the eNodeB 102 in step S101. It can be envisaged that a single one of the UEs submit a further request for content to the eNodeB 102, wherein the eNodeB 102 multicasts the further requested content to the UEs 103, 104, 105.

Figure 6A:
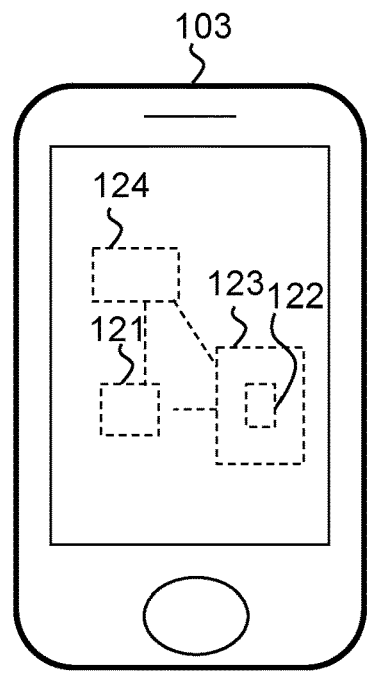
FIG. 6a illustrates a UE according to an embodiment of the invention.
Figure 6B:
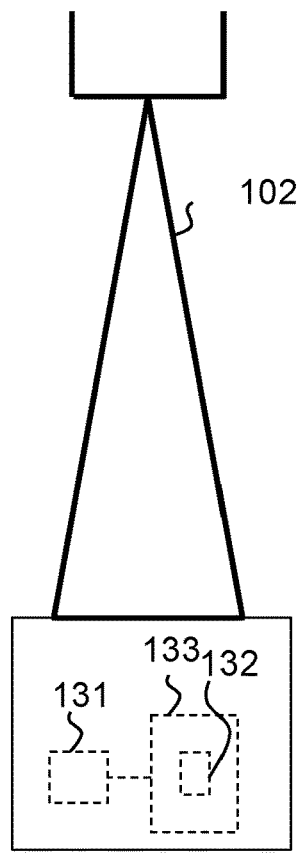
FIG. 6b illustrates an RBS according to an embodiment of the invention.

FIG. 6a illustrates a UE 103 according to an embodiment of the invention, while FIG. 6b illustrates an RBS 102 according to an embodiment of the invention.

As has been mentioned, the UE 103 comprises a client, such as a media player 124, for rendering ICN content received from the RBS 102, which content is loaded into storage 123, being e.g. a cache memory, by processing unit 121. When the media player 124 is to render content, it turns to the cache 123, typically via the processing unit 121, for acquiring the ICN content provided to the UE 103 by the RBS 102.

The steps of the method performed by the UE 103 according to embodiments of the invention are in practice performed by a processing unit 121 embodied in the form of one or more microprocessors arranged to execute a computer program 122 downloaded to the storage medium 123 associated with the microprocessor, such as a Random Access Memory (RAM), a Flash memory or a hard disk drive. The storage 123 is not necessarily shared with the media player 124, but the media player 124 may have its own cache from where it acquires ICN content.

The processing unit 121 is arranged to cause the UE 103 to carry out the method according to embodiments of the present invention when the appropriate computer program 122 comprising computer-executable instructions is downloaded to the storage medium 123 and executed by the processing unit 121. The storage medium 123 may also be a computer program product comprising the computer program 122. Alternatively, the computer program 122 may be transferred to the storage medium 123 by means of a suitable computer program product, such as a Digital Versatile Disc (DVD) or a memory stick. As a further alternative, the computer program 122 may be downloaded to the storage medium 123 over a network. The processing unit 121 may alternatively be embodied in the form of a digital signal processor (DSP), an application specific integrated circuit (ASIC), a field-programmable gate array (FPGA), a complex programmable logic device (CPLD), etc.

The steps of the method performed by RBS 102 of FIG. 6b according to embodiments of the invention are similarly in practice performed by a processing unit 131 embodied in the form of one or more microprocessors arranged to execute a computer program 132 downloaded to the storage medium 133 associated with the microprocessor, such as a Random Access Memory (RAM), a Flash memory or a hard disk drive. The processing unit 131 is arranged to cause the RBS 102 to carry out the method according to embodiments of the present invention when the appropriate computer program 132 comprising computer-executable instructions is downloaded to the storage medium 133 and executed by the processing unit 131. The storage medium 133 may also be a computer program product comprising the computer program 132. Alternatively, the computer program 132 may be transferred to the storage medium 133 by means of a suitable computer program product, such as a Digital Versatile Disc (DVD) or a memory stick. As a further alternative, the computer program 132 may be downloaded to the storage medium 133 over a network. The processing unit 121 may alternatively be embodied in the form of a digital signal processor (DSP), an application specific integrated circuit (ASIC), a field-programmable gate array (FPGA), a complex programmable logic device (CPLD), etc.

Streaming of content from the ICN nodes 102, 110 over the RBS 102 and on to the UEs 103, 104, 105 may be performed using Adaptive Bitrate Streaming utilizing a protocol such as Hypertext Transfer Protocol (HTTP) Live Streaming (HLS) or Moving Picture Experts Group Dynamic Adaptive Streaming over HTTP (MPEG-DASH).

Correspondingly, the media player 124 is adapted to DASH and HLS and is equipped with an ICN access module for performing ICN functionality.

Communication between the RBS 102 and UE 103 is undertaken over two channels: a point-to-point (PTP) channel and a point-to-multipoint channel (PTM) such as Multicast Traffic Channel (MTC).

As previously has been described, when the RBS 102 realizes that several UEs, such as UEs 103, 104,105, subscribes to the same content, the RBS 102 can establish an eMBMS multicast channel and informs the UEs accordingly. The caches in the respective UE, once tuned in to the eMBMS traffic channel, will then "pre-cache" the content chunks forming the content coming over the eMBMS traffic channel. When the media players 124 of the UEs ask for the next content chunk for rendering, that chunk is cached locally, and no individual request needs to be sent to the RBS 102 from any one of the UEs 103, 104, 105. It should be noted that a request in ICN terminology commonly is referred to as an "interest".

The eMBMS client executing on the RBS 102 will be local to the radio access of the RBS. Thus, for upstream nodes such as e.g. ICN nodes 109, 110 or the content provider 112, the RBS 102 will still present an ICN interface. Further, the eMBMS client executing on the RBS 102 may be dedicated to ICN; no complex eMBMS support infrastructure is as a result required higher up in the 3GPP parts of the network.

It can further be envisaged that the eMBMS channel is pre-established and using System Information Broadcast (SIB) to inform UEs thereof. Another facility is to use different multicast traffic channels for different terminal types watching the same content (in support of caching for Adaptive Bitrate Streaming).

From a perspective of the RBS 102, the PTM channel serving as an interface towards UEs is deployed for popular-content delivery when more than one UE in the cell is viewing the same content, such as linear TV. The RBS 102 decides when content is delivered on the PTM. If it receives requests/interest from different UEs for the same content, the RBS moves the delivery from PTP channel to PTM channel and notifies the UEs accordingly that the content will be received via the PTM channel.

In order to advantageously make efficient use of radio resources, the mapping of popular/linear content ICN streams onto MTCs is done by the RBS.

Figure 7:
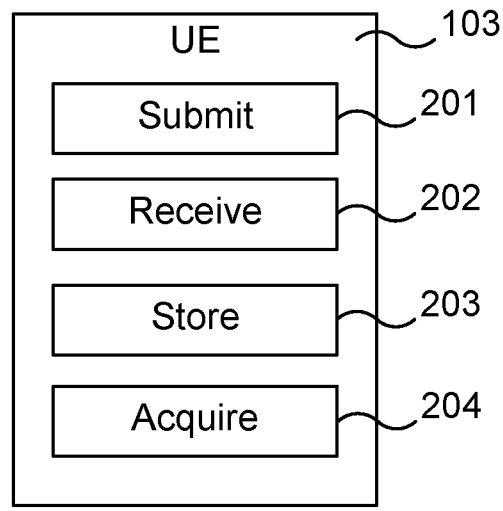
FIG. 7 illustrates a UE according to another embodiment of the invention.

FIG. 7 illustrates a UE 103 according to a further embodiment configured to acquire content. The UE 103 comprises submitting means 201 adapted to submit a request for content to an RBS, receiving means 202 adapted to receive, in reply to the request, the requested content from the RBS, the content being acquired by the RBS from an ICN node and provided to the UE 103 from the RBS upon the RBS receiving the ICN content, storing means 203 adapted to store the received ICN content in a local storage at the UE 103, and acquiring means 204 adapted to acquire, when a piece of content is to be rendered at the UE 103, the piece of content from the received ICN content in the local storage.

The means 201-204 may comprise a communications interface for receiving and providing information, and further a local storage for storing data, and may (in analogy with the description given in connection to FIG. 6a) be implemented by a processor embodied in the form of one or more microprocessors arranged to execute a computer program downloaded to a suitable storage medium associated with the microprocessor, such as a RAM, a Flash memory or a hard disk drive.

Figure 8:
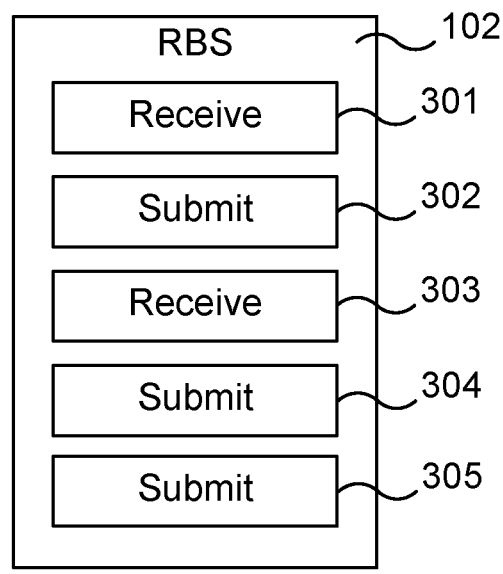
FIG. 8 illustrates an RBS according to another embodiment of the invention.

FIG. 8 illustrates an RBS 102 according to a further embodiment configured to supply ICN content to at least one UE. The RBS 102 comprises receiving means 301 adapted to receive a request for content from the at least one UE, submitting means 302 adapted to submit a request for the content to at least one ICN node, receiving means 303 adapted to receive the requested content from the ICN node, submitting means 304 adapted to submit the received ICN content to said at least one UE, for subsequent caching at the at least one UE, and submitting means 305 adapted to continuously submit requests for the requested content to the at least one ICN node and to submit any further received ICN content to the at least one UE, until no further content is received from the at least one ICN node.

The means 301-305 may comprise a communications interface for receiving and providing information, and further a local storage for storing data, and may (in analogy with the description given in connection to FIG. 6a) be implemented by a processor embodied in the form of one or more microprocessors arranged to execute a computer program downloaded to a suitable storage medium associated with the microprocessor, such as a RAM, a Flash memory or a hard disk drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed at a User Equipment (UE) of acquiring content, comprising:
    submitting a request for content, that is live-streamed, to a Radio Base Station (RBS);
    receiving, in reply to the request, the requested content from the RBS, the content being acquired by the RBS from an Information Centric Networking (ICN) node and provided to the UE from the RBS upon the RBS receiving the content as ICN content, wherein the RBS continuously submits requests to the ICN node to obtain live-stream delivery of the ICN content without further content requests from the UE;
    storing the received ICN content in a local storage at the UE;
    acquiring, when a piece of content is to be rendered at the UE, the piece of content from the received ICN content in the local storage; and
    submitting a second request to the RBS for a missing piece of the content when a piece of the ICN content is missing in the local storage.

2. The method of claim 1, further comprising:
    continuously receiving, in reply to the request, ICN content from the RBS and storing the continuously received ICN content in the local storage.

3. The method of claim 1, wherein the requested content being received via a multicast channel of the RBS.

4. The method of claim 1, wherein the ICN content being received via an Enhanced Multicast Broadcast Multimedia Service (eMBMS) channel of the RBS.

5. A method performed at a Radio Base Station (RBS) of supplying Information Centric Networking (ICN) content to at least one User Equipment (UE), comprising:
receiving a request for content, that is to be live-streamed, from the at least one UE;
submitting a request for the content to at least one ICN node;
receiving the requested content as the ICN content from the ICN node;
submitting the received ICN content to said at least one UE, for subsequent caching at the at least one UE; and
continuously submitting requests to said at least one ICN node to obtain live-stream delivery of the ICN content without further content requests from the UE and submitting any further received ICN content to said at least one UE, until no further content is received from the at least one ICN node.

6. The method of claim 5, wherein the submitting of the received ICN content comprises:
multicasting the received ICN content to a plurality of UEs, for caching at said plurality of UEs.

7. The method of claim 6, wherein the receiving of a request comprises:
receiving a request for the content from a plurality of UEs, wherein the submitting of the request for content comprises submitting a common request for the content to said at least one ICN node.

8. The method of claim 6, wherein the ICN content being multicasted via an Enhanced Multicast Broadcast Multimedia Service (eMBMS) channel.

9. The method of claim 6, wherein if requests for the same content are received from a plurality of UEs, the method comprising:
instructing said plurality of UEs to monitor multicast or broadcast channels over which the ICN content will be provided.

10. A User Equipment (UE) configured to acquire content, which UE comprises:
a processing unit; and
a memory containing instructions executable by said processing unit and when executed, said UE is operative to:
submit a request for content, that is live-streamed, to a Radio Base Station (RBS);
receive, in reply to the request, the requested content from the RBS, the content being acquired by the RBS from an Information Centric Networking (ICN) node and provided to the UE from the RBS upon the RBS receiving the content as ICN content, wherein the RBS continuously submits requests to the ICN node to obtain live-stream delivery of the ICN content without further content requests from the UE;
store the received ICN content in the memory of the UE;
acquire, when a piece of content is to be rendered at the UE, the piece of content from the received ICN content in the memory; and
submit a second request to the RBS for a missing piece of the content when a piece of the ICN content is missing in the memory.

11. The UE of claim 10, further being operative to:
continuously receive, in reply to the request, ICN content from the RBS and store the continuously received ICN content in the memory.

12. The UE of claim 10, further being operative to receive the requested content via a multicast channel of the RBS.

13. The UE of claim 10, further being operative to receive the ICN content via an Enhanced Multicast Broadcast Multimedia Service (eMBMS) channel of the RBS.

14. The UE of claim 10, further comprising:
a client configured to render the content on the UE.

15. A Radio Base Station (RBS) configured to supply Information Centric Networking (ICN) content to at least one User Equipment (UE) which RBS comprises:
a processing unit; and
a memory containing instructions executable by said processing unit and when executed, said RBS is operative to:
receive a request for content, that is to be live-streamed from the at least one UE;
submit a request for the content to at least one ICN node;
receive the requested content as ICN content from the at least one ICN node;
submit the received ICN content to said at least one UE, for subsequent caching at the at least one UE; and
continuously submit requests to said at least one ICN node to obtain live-stream delivery of the ICN content without further content requests from the UE and submit any further received ICN content to said at least one UE, until no further content is received from the at least one ICN node.

16. The RBS of claim 15, further being operative to, when submitting the received ICN content:
multicast the received ICN content to a plurality of UEs, for subsequent caching at said plurality of UEs.

17. The RBS of claim 16, further being operative to, when receiving a request:
receive a request for the content from a plurality of UEs, and to, when submitting the request for content:
submit a common request for the content to said at least one ICN node.

18. The RBS of claim 16, wherein the ICN content being multicasted via an Enhanced Multicast Broadcast Multimedia Service (eMBMS) channel.

19. The RBS of claim 16, wherein if requests for the same content are received from a plurality of UEs, the RBS further being operative to:
instruct said plurality of UEs to monitor multicast or broadcast channels over which the ICN content will be provided.

20. The RBS of claim 15, further comprising the at least one ICN node.

21. A non-transitory computer-readable storage medium, having stored thereon a computer program comprising instructions which, when executed on a processor of a User Equipment (UE), instructs the UE to perform operations comprising:
submitting a request for content, that is live-streamed, to a Radio Base Station (RBS);
receiving, in reply to the request, the requested content from the RBS, the content being acquired by the RBS from an Information Centric Networking (ICN) node and provided to the UE from the RBS upon the RBS receiving the content as ICN content, wherein the RBS continuously submits requests to the ICN node to obtain live-stream delivery of the ICN content without further content requests from the UE;

storing the received ICN content in a local storage at the UE;

acquiring, when a piece of content is to be rendered at the UE, the piece of content from the received ICN content in the local storage; and submitting a second request to the RBS for a missing piece of the content when a piece of the ICN content is missing in the local storage.

22. A non-transitory computer-readable storage medium, having stored thereon a computer program comprising instructions which, when executed on a processor of a Radio Base Station (RBS) supplying ICN content to at least one User Equipment (UE), instructs the RBS to perform operations comprising:

receiving a request for content, that is to be live-streamed, from the at least one UE;

submitting a request for the content to at least one Information Centric Networking (ICN) node;

receiving the requested content from the ICN node;

submitting the received ICN content to said at least one UE, for subsequent caching at the at least one UE; and continuously submitting requests to said at least one ICN node to obtain live-stream delivery of the ICN content without further content requests from the UE and submitting any further received ICN content to said at least one UE, until no further content is received from the at least one ICN node.

* * * * *